United States Patent [19]
Price

[11] 3,943,838
[45] Mar. 16, 1976

[54] BASTING OR COOKING DEVICE

[76] Inventor: Harry D. Price, 5 Center Circle, Wilmington, Del. 19808

[22] Filed: Aug. 7, 1974

[21] Appl. No.: 495,532

[52] U.S. Cl. ............................... 99/345; 99/403
[51] Int. Cl.² ........................................ A47J 36/18
[58] Field of Search ............... 99/345, 410–411, 99/412–413, 414–415, 416–417, 418, 448–449, 450; 126/384, 390; 220/20, 208, 366, 374

[56] References Cited
UNITED STATES PATENTS

| | | | |
|---|---|---|---|
| 663,483 | 12/1900 | Betts | 99/450 X |
| 812,884 | 2/1906 | Sager | 99/414 UX |
| 1,300,565 | 4/1919 | Bowers et al. | 99/450 |
| 1,699,869 | 1/1929 | Bienvenu | 126/390 |
| 2,179,512 | 11/1939 | McBirney | 99/450 |
| 2,573,719 | 11/1951 | Lebherz | 126/384 UX |
| 2,849,945 | 9/1958 | Crowley | 99/450 X |

*Primary Examiner*—Robert W. Jenkins
*Assistant Examiner*—Arthur O. Henderson
*Attorney, Agent, or Firm*—C. Walter Mortenson

[57] ABSTRACT

There is provided by this invention a device for holding solid materials while affording passage of liquids through the device which has an element that is open at the top and at the bottom, there being attachable to the element at its bottom walls a plate which in operative position spans the four walls at the bottom and is closely positioned to, but out of contact, with the bottom edges of the four walls and thus affords a gap for the ingress and egress of liquids.

10 Claims, 4 Drawing Figures

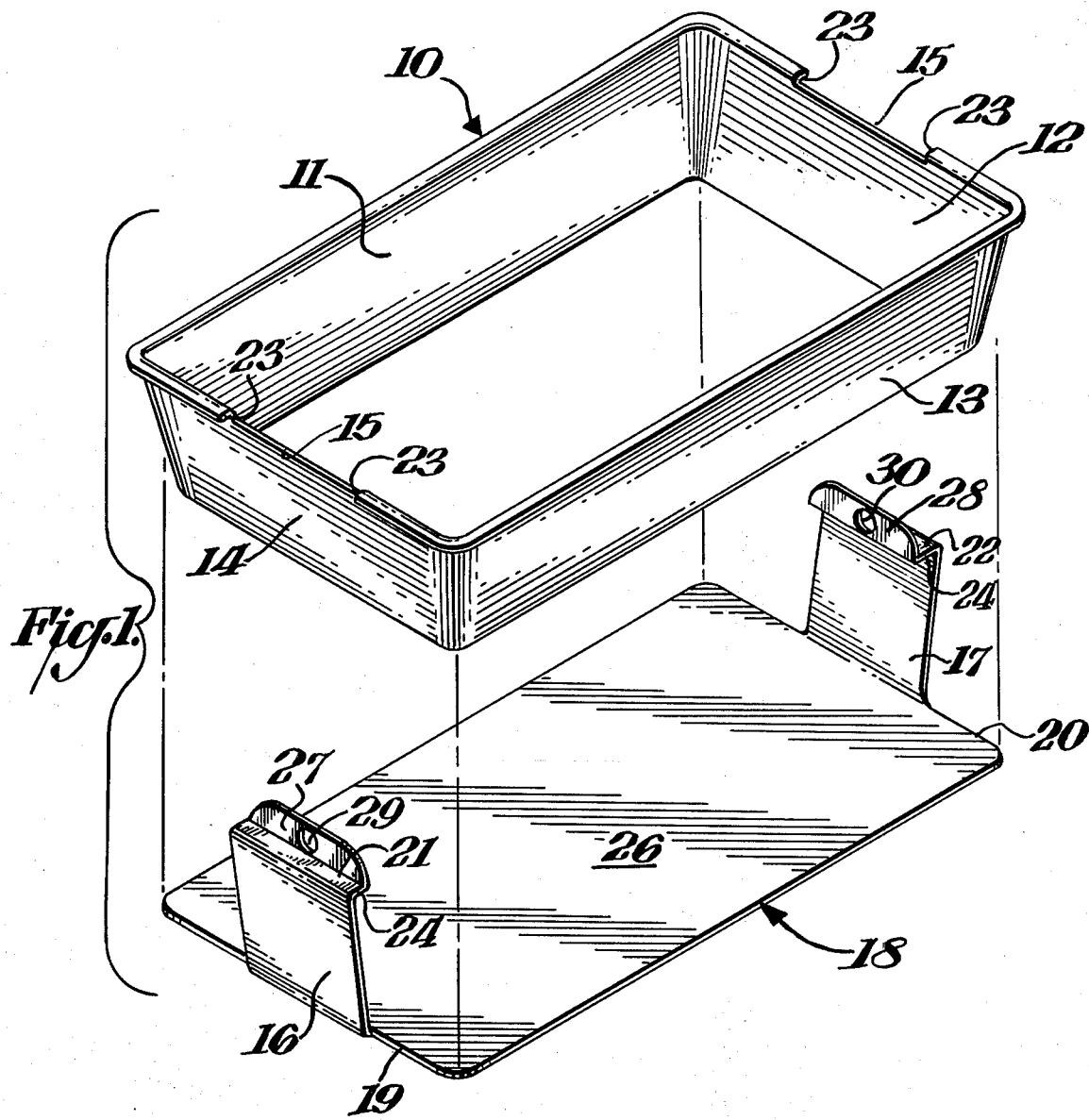

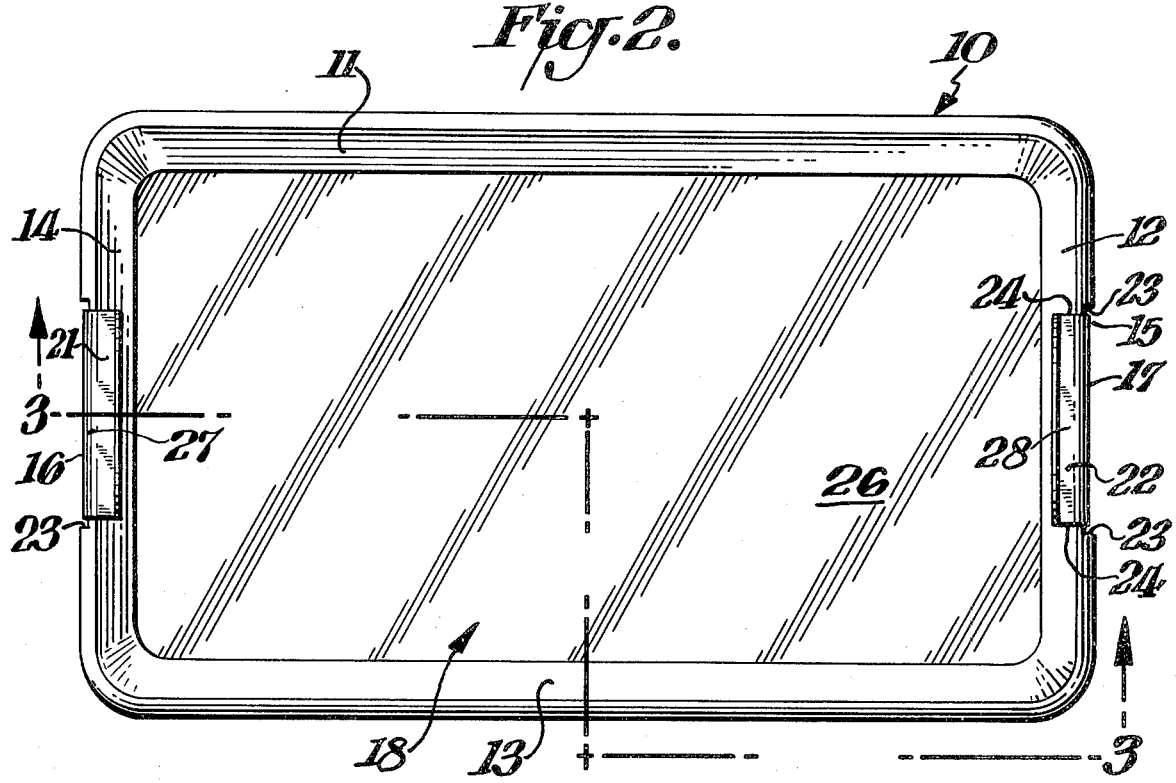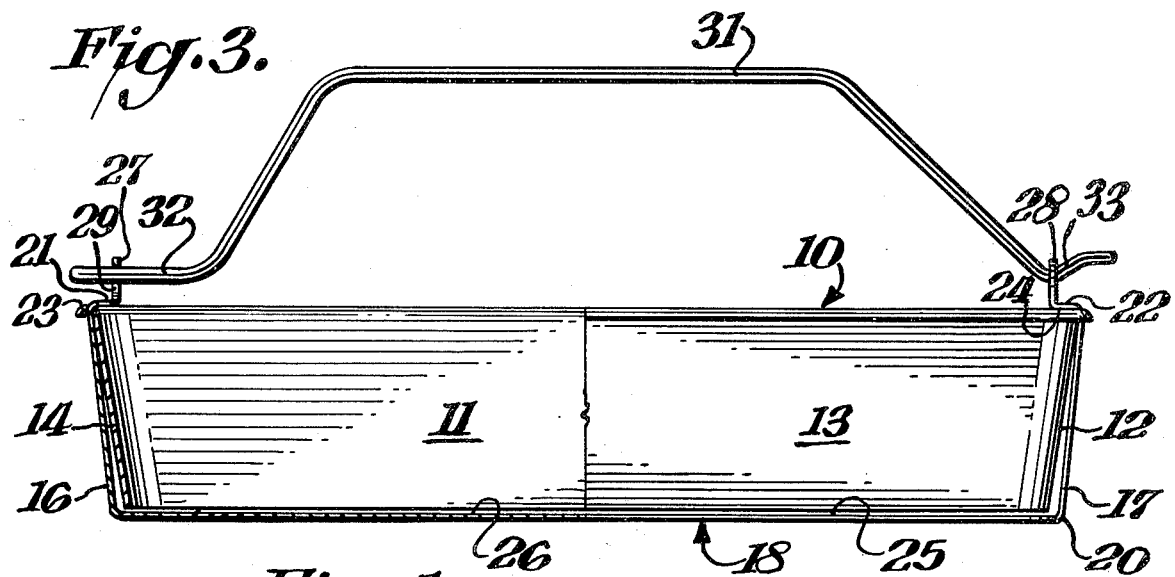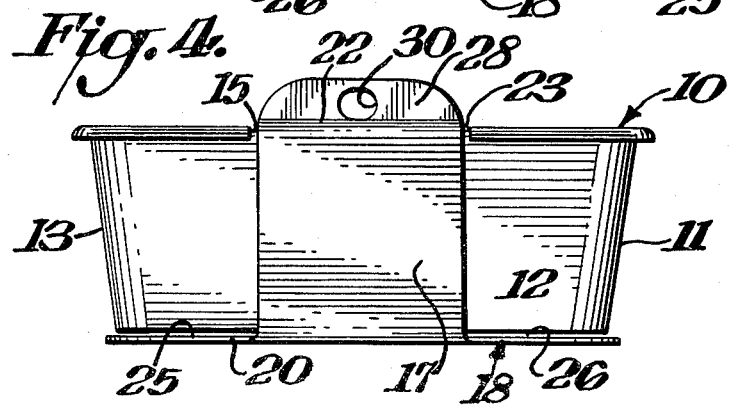

BASTING OR COOKING DEVICE

BACKGROUND OF THE INVENTION

There have been described and made available a large number of cooking utensils which afford basting during cooking processes. Certain of these devices provide means for removing excess liquids, such as the excess fats during frying of foods, in order that the fat content may be reduced. Further, a number of these devices contain various elements for supporting food material at certain localities to prevent scorching and burning of the food. Also, it is old to introduce directly into the interior of materials flavoring liquids during the cooking. However, there has been a need for a device which affords a way of utilizing the natural juices that are produced during roasting as a flavoring fluid for other foods that are in a particulate form, such as rice. It is well known, of course, to place such foods as potatoes directly in the roasting pan along with the material to be roasted and to cook such and baste such during the preparation of the roast. Hitherto, there has been no convenient way of handling grains, such as rice, in a roasting process.

Accordingly, it is an object of this invention to provide a cooking utensil that allows one to cook and baste particulate foods during cooking processes being applied to other foods, such as a ham, a fowl, or a beef roast. A further object is to provide such an utensil that is of such a size and construction that it may be easily placed in the roasting pan, in a frying pan, pressure cooker or the like and readily removed. A further objective is to provide such a device that is effective in containing the small particles of such a food as rice while at the same time allowing the passage of liquids into and out of the device. These and other aims will be seen hereinafter with reference to the drawings and the following description all of which is given for illustrative purposes only.

BRIEF DESCRIPTION OF THE DRAWINGS

FIG. 1 is a perspective view showing the upper section of the device and illustrating how the bottom, clip-on portion is attachable to the upper section;

FIG. 2 is a plan view of the top section of FIG. 1 but with the bottom section in the attached position;

FIG. 3 is taken on line 3—3 of FIG. 2; and

FIG. 4 is an end view of the assembled device.

DESCRIPTION OF THE DRAWINGS AND EMBODIMENTS

As can be seen in FIG. 1 the upper section 10 of the device is made up of the four walls 11, 12, 13 and 14. This upper section has no bottom, the connected walls forming an opening at the bottom and an opening at the top. In the top edges of the walls 12 and 14 there is provided a gap or cutaway section 15 adapted to receive in locking relationship the clips 16 and 17 attached to the bottom section 18. These clips are spring-like members that are fixed to the respective bottom walls 19 and 20 of bottom 18 though they may be fixed to the top element 10, or they may be separate devices fixed to neither but adapted to clip to both to hold the sections 10 and 18 together. While the other side walls of bottom section 18 may be similarly equipped with spring clips, such are not necessary, and in fact, a single attaching means such as element 16 can be used effectively. However, the provision of the two clips 16 and 17 affords an easier handling of the device, two being preferred.

The phantom lines shown in FIG. 1 illustrate how the bottom section and the top section go together to form the complete container of this invention. The assembled container is shown in FIGS. 2, 3 and 4. In FIG. 2, a plan view, the top sections 21 and 22, respectively, of clips 16 and 17 are shown in a locked relationship with the top edges of walls 12 and 14. The overhanging sections 21 and 22 of the respective clips hold the bottom 18 in a fixed relationship with the top section 10. The bottom section 18 cannot slide in any horizontal direction because the retaining walls 23 of the cut-away sections 15 prevent such movement. FUrther, the bottom section 18 will not move in vertical directions because the frictional contact between the retaining walls 23 of cut-away sections 17 with the side walls 24 of clips 16 and 27 prevent such movement.

Therefore, there is maintained at all times a gap 25, shown in FIGS. 3 and 4, between the bottom edges of the walls 11, 12, 13 and 14 and the top surface 26 of bottom 18. The cut-away sections 15, while convenient and preferred, are not essential since the strength of the clips 16 and 17 and the resultant frictional contacts may make for sufficient rigidity. In any event gap 25 is such that it prevents the falling out of small particles of foods, such as kernels of rice, and yet at the same time allows liquids to pass out of the device of this invention and into the roasting pan into which it is placed or whatever other receptacle the device of this invention is being used with in the cooking processes or in steps used before or after the cooking processes.

As shown in FIG. 3, there is also provided a handle 31 which is removable. Each of the uppermost top sections of clips 16 and 17 has an extension 27 and 28, respectively, shown in FIGS. 1 and 3. In each of these extending sections there is a hole 29 and 30, respectively. The ends of the handle 31 are conveniently placed in those apertures, the ends 32 and 33 being of such lengths that they can be slid back and forth in the holes to provide the entrance first of the one and then the other and repositioning to hold the handle in lifting relationship with the assembled container as shown in FIG. 3.

In FIG. 4, an end view of the assembled device, the handle has been omitted for convenience.

In using the device, one simply spreads clips 16 and 17 apart sufficiently to allow top section 10 to be placed in close relationship with bottom section 18 followed by the positioning of the top sections 21 and 22 of the clips 16 and 17 into their respective cut-away portions 15. The user then has a container into which can be placed any number of particulate foods, such as rice, in any amount as is desired. The assembled device then is placed into the roasting pan, not shown for convenience, allowing the bottom 18 to rest directly on the bottom of the roasting pan. The gap 25 is a gap of about 1/32 inch to about ⅛ inch, but in any event is less than the thickness of the individual pieces of the particulate material. The clips are, of course, flexible and by varying the tilt of the clip with respect to the side walls, thickness of the gap can be varied sufficiently for safe operations. In other words, the gap is of such a dimension that the individual pieces or kernels of the pulverized or particulate food, such as rice, cannot fall out of the assembled device.

In using the device, an amount of food to be treated is placed in the device either before or after the device has been placed in the roasting pan that contains the roast or other food that is to be cooked. The bottom section 18 rests directly on the bottom of the roasting pan. There is always present gap 25, for as explained above, the device is so constructed that once assembled the gap is in a fixed position. The weight of the particulate food resting on the top surface of bottom 18 also assures the presence of gap 25.

Generally, the particulate food that is being used, such as rice, has been precooked, although this is not necessary. However, with most grains precooking is desired since a considerable amount of time is involved in cooking such an item as rice. Further, having the kernels of rice in a precooked state assures the desired flavoring in a shorter period of time, since the individual kernels are swollen and are more readily penetrated by the flavoring fluids. The user simply gathers together the natural juices that have been formed during the roasting and pours the liquid into the top section, distributing it as desired over the particulate foods that are contained in the device and allowing the liquid to flow downwardly by gravity, thus effecting absorption and allowing any excess to pass out through gap 25 and back into the roasting pan. The device also permits the flow of fluids in the bottom of the pan naturally into the gap 25 and into the foods contained in the bottom if there is sufficient material in the bottom of the roasting pan to get up to the top surface 26 of bottom 18. In any event the user effects the basting procedure to the extent that he desires and then inserts the handle 31 into the device and removes the device of this invention at such time when the process has been finished to his desire. Then by simply moving clips 16 and 17 sufficiently from gaps 15, the user can tilt bottom 18 downwardly and dump out the contents, or he can remove it completely and then remove the particulate material from top surface 26 into such other container as is desired.

Another use can be illustrated in which unwanted grease is removed as it is formed. For example, the bottom 18 can, in effect, be used as a frying pan or surface by placing the device in a conventional frying pan of proper size or on a grill so that bottom 18 is heated. Bacon or similar materials to be fried when placed on top of surface 18 can be fried under conditions in which the fat that is melted flows out of the device as the cooking occurs. If desired, a cover, not shown for convenience, may be supplied but generally this is not needed as one usually desires the open access to the device to effect basting or to watch the cooking as it progresses.

The device of this invention is readily assembled and disassembled. The surfaces thereof are largely flat and expansive, thus affording ready cleaning. This is an extremely important advantage with such a material as rice, the cooking of which generally leads to difficult cleaning of the devices used in its cooking. There are no small perforations used in any parts of the device other than, of course, the handle holes 29 and 30, but these do not come into cooking relationship with any of the food materials. Thus, the tedious and difficult cleaning of tiny or small holes is entirely avoided. Another advantage of the device of this invention rests in the fact that different foods which require different times can be treated separately and at the end of their treating periods, they may be again all placed in the container of this device and kept in the roasting pan to be kept warm until such time as they are to be served.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

What is claimed is:

1. A device for placement on the bottom of a cooking utensil and for holding solid materials while affording passage of liquids therethrough comprising an element having four walls and being open at the top and the bottom; and a plate attachable in operative position with said element resting said bottom of close to said utensil and spanning said opening at said bottom of said element and becomes closely positioned to, but out of contact with, the bottom edges of said walls, thus affording a gap for the ingress and egress of said liquids.

2. A device in accordance with claim 1 in which device said gap is in the range of about 1/32 of an inch to about ⅛ of an inch.

3. A device in accordance with claim 1 in which said attachable plate is unperforated and contains means for attaching it to said element.

4. A device in accordance with claim 3 in which said attaching means comprises clips.

5. A device in accordance with claim 4 in which said clips when in attached position have a portion thereof extending above the top edges of the walls of said element.

6. A device in accordance with claim 5 in which each of said extending portions of said clips contains a hole.

7. A device in accordance with claim 6 in combination with a handle mountable to said device in said holes.

8. A device in accordance with claim 3 in which the top edges of said walls of said element bear a flange.

9. A device in accordance with claim 3 in which each of two opposite walls of said element has a cut-away section in it.

10. A device in accordance with claim 9 in which said cut-away sections are so dimensioned to afford ready and effective attachment of said plate by clipping means.

* * * * *

UNITED STATES PATENT OFFICE
CERTIFICATE OF CORRECTION

Patent No. 3,943,838　　　　　　　　　Dated March 16, 1976

Inventor(s) Harry D. Price

It is certified that error appears in the above-identified patent and that said Letters Patent are hereby corrected as shown below:

Claim 1 should read as follows:

-A device for placement on the bottom of a cooking utensil and for holding solid materials while affording passage of liquids therethrough comprising an element having four walls and being open at the top and the bottom; and a plate attachable in operative position with said element resting close to said bottom of said utensil and spanning said opening at said bottom of said element and becomes closely positioned to, but out of contact with, the bottom edges of said walls, thus affording a gap for ingress and egress of said liquids.-

Signed and Sealed this

Twenty-third Day of November 1976

[SEAL]

Attest:

RUTH C. MASON  
Attesting Officer

C. MARSHALL DANN  
Commissioner of Patents and Trademarks